US007014877B2

(12) United States Patent
Lobl

(10) Patent No.: US 7,014,877 B2
(45) Date of Patent: Mar. 21, 2006

(54) LOLLIPOP STICK AND LOLLIPOP CONTAINER

(75) Inventor: Naftali Lobl, Ramat Gan (IL)

(73) Assignee: Zip-Pop Manufacturing & Marketing Ltd., Ramat Gan (IL)

( * ) Notice: Subject to any disclaimer, the term of this patent is extended or adjusted under 35 U.S.C. 154(b) by 14 days.

(21) Appl. No.: 10/463,909

(22) Filed: Jun. 18, 2003

(65) Prior Publication Data

US 2004/0258804 A1 Dec. 23, 2004

(51) Int. Cl.
*A23G 3/00* (2006.01)

(52) U.S. Cl. ........................ 426/110; 426/91; 426/134; 426/421

(58) Field of Classification Search ................ 426/110, 426/91, 134, 421
See application file for complete search history.

(56) References Cited

U.S. PATENT DOCUMENTS 4,274,429 A * 6/1981 Kinski ....................... 135/20.1
6,120,816 A * 9/2000 Chan .......................... 426/104

* cited by examiner

*Primary Examiner*—Milton Cano
(74) *Attorney, Agent, or Firm*—Pearl Cohen Zedek Latzer, LLP

(57) ABSTRACT

The invention relates to the automatic marketing of lollipops, by providing a lollipop stick made of a flexible material in combination with a compact lollipop container, wherein the stick is provided with a dividable end and a candy retention end, the major portion of the stick being dividable into two elongated halves by insertion into a compact lollipop container, a separation device causing separation of the elongated halves, may be provided at the bottom of the container and bending thereof at least 180 degrees during the insertion resulting from contact with inner walls of the container, a candy being firmly attached to the candy retention end, the stick being retained in the divided and bent configuration, the compact lollipop container being further provided with a reunification device, whereby on opening of the container and withdrawal there from of the candy the two elongated stick halves pass through the reunification device and are firmly rejoined thereby to form a substantially straight rigid stick supporting the candy.

11 Claims, 4 Drawing Sheets

FIG. 1
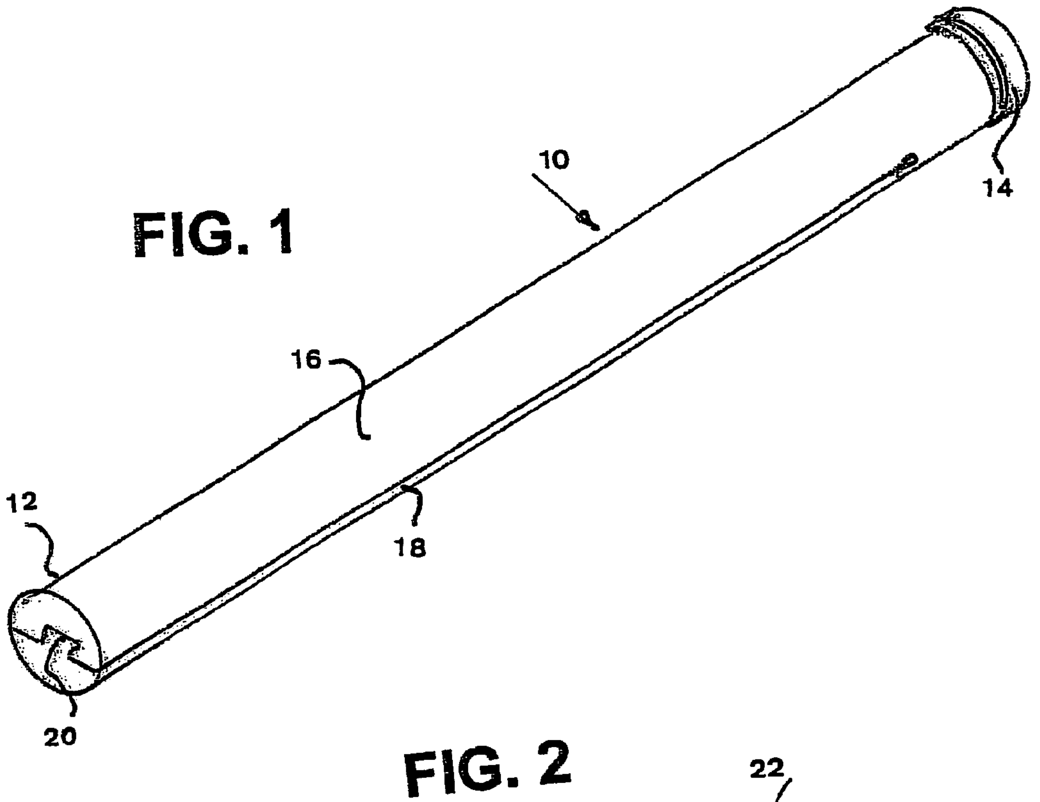
FIG. 2
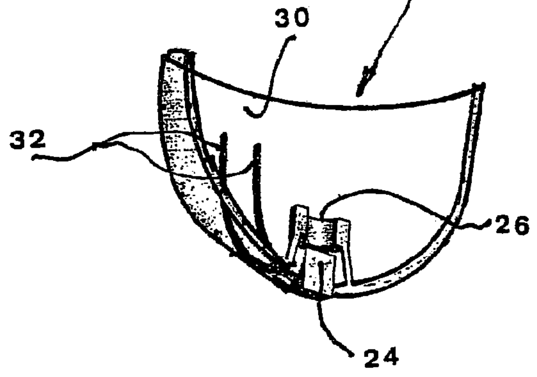
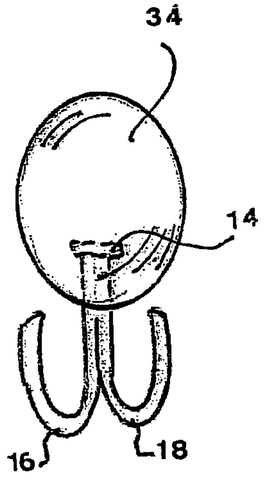
FIG. 3
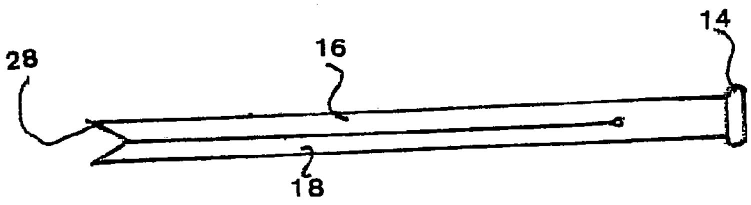
FIG. 4

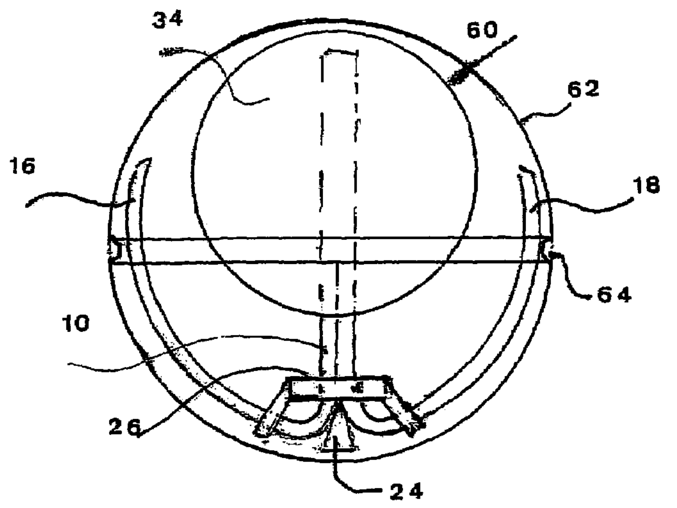
FIG. 8
FIG. 9
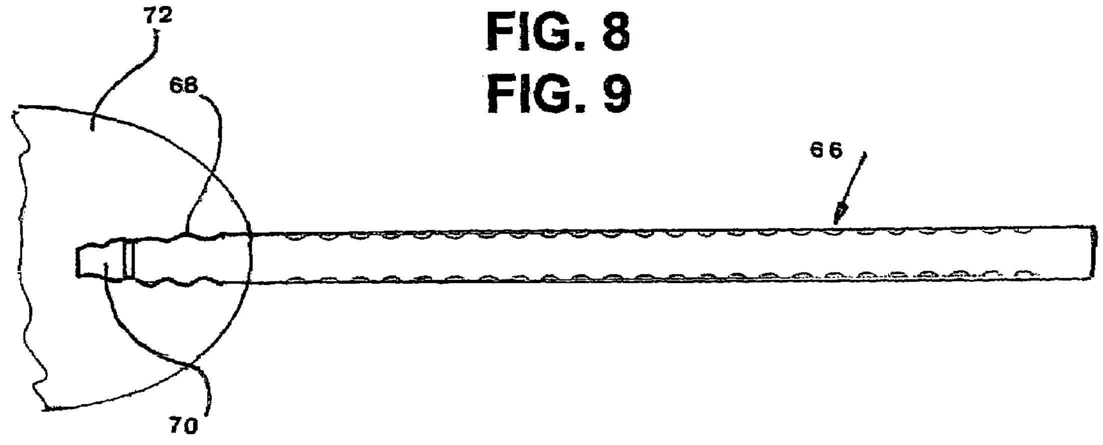

LOLLIPOP STICK AND LOLLIPOP CONTAINER

FILED AND BACKGROUND OF THE INVENTION

The present invention relates to the automatic marketing of lollipops. More particularly, the invention provides a bendable lollipop stick, a container for the lollipop, and a method of sale for same.

Vending machines have long provided an economic method for selling small consumer articles. Presently machines are in use for selling hot and cold beverages, cigarettes, sweets, chocolates, other foods, newspapers, train tickets and many other items. The machines must reliably dispense the one item chosen by a customer after an appropriate coin, or a smart card, has been inserted into the machine. Vending machines offer their owner low labor cost, while 24-hour availability is beneficial to both owner and customer.

Before stock exhaustion, it is necessary to recharge the machine with a new supply of articles to be sold. There are three methods of loading or reloading a vending machine.

METHOD A The items to be sold, for example packets of cigarettes or bars of chocolate, are already arranged in a stack or other orderly manner and so they are easily loaded into the machine in a coherent array, e.g. a stack. The vending machine requires only a simple feed and escape mechanism to dispense a selected item in response to customer demand. The machine is not required to reorient the items to be sold.

METHOD B The articles to be sold, for example a small cube-shaped item, are poured into the machine in bulk, and the machine is provided with a feeder mechanism for orienting the item in a manner allowing reliable operation of an escape mechanism. The difficulty of automatic handling is related primarily to the shape of the article. For example, a spherical item (e.g. a chewing gum ball) is easiest for a machine to handle, as it will roll under gravity in any direction and requires only a primitive escape mechanism and requires no orientation at all. More difficult is an item shaped as a short cylinder where the length equals or is near the diameter. Some shapes, for example items that entangle with each other, e.g. open compression coil springs, horseshoe shaped items, and irregularly shaped articles such as fruit or vegetable items that may be sticky and light weight—these are difficult or almost impossible to feed in a reliable manner using method B, and are best handled after enclosure in a geometrically-shaped container of fixed compact size.

METHOD C Items which cannot be handled by the previous methods, for example wrapped confectionery food articles, baked buns, or slices of cake are manually and individually loaded into suitable receptacles provided in the machine. Individual loading is time consuming but is acceptable for high-value articles. Individual loading into the vending machine is however not an economic option for small low-cost articles.

From the point of view of the vending machine, a lollipop is a lightweight low-cost item, which may be sticky and is covered by a paper wrapping which may be of irregular configuration. In U.S. Pat. No. 5,485,939 Tucker discloses a lollipop dispensing apparatus using Method C. Clearly, loading such a vending machine is time consuming and the dispensing mechanism required is complex.

Method B mechanisms for dispensing lollipops are also known. Such mechanisms are very complex and expensive, obviously due to the difficulties inherent in reliably feeding an article of this shape and of low weight. There is also the possibility that the article, possibly being sticky, will cause unreliable dispensing performance.

Consumers of lollipops are likely to require temporary storage thereof for example while entering a classroom or a house of prayer. If a paper wrapping thereof was provided and is still to hand said wrapping can be used for this purpose. An attractive alternative providing compact and hygienic storage is to use the original marketing container also for compact rest rage, hereafter the lollipop in its container can be conveniently held in a pocket of a child's clothing.

OBJECTS OF THE INVENTION

It is therefore one of the objects of the present invention to obviate the disadvantages of prior art lollipop vending methods and to provide a stick which can be bent more than 180° when inserted into a compact container and will regain its original straight and substantially rigid form when removed from said container.

It is a further object of the present invention to provide a compact lollipop container, which accepts the lollipop while sharply bending the stick thereof, the container later being available to the consumer and serving as a holder for a partly consumed lollipop.

Yet a further object is to provide a method for marketing lollipops by means of a vending machine.

It should be noted that the method and means described could also be used with other packages not just spherical containers.

SUMMARY OF THE INVENTION

The present invention achieves the above objects by providing a lollipop stick made of a flexible material in combination with a compact lollipop container, wherein said stick is provided with a dividable end and a candy retention end, the major portion of said stick being dividable into two elongated halves by insertion into a compact lollipop container, a separation device, causing separation of said elongated halves, may be provided at the bottom of the container and bending thereof of at least 180 degrees during said insertion resulting from contact with inner walls of said container, a candy being firmly attached to said candy retention end, said stick being retained in said divided and bent configuration, said compact lollipop container being further provided with a reunification device, whereby on opening of said container and withdrawal there from of said candy said two elongated stick halves pass through said reunification device and are firmly rejoined thereby to form a substantially straight rigid stick supporting said candy.

In a preferred embodiment of the present invention there is provided a lollipop stick in combination with a compact lollipop container as claimed in claim 1, said container being completed by attachment thereto of a discrete closure to form a housing shape readily dispensed by a simple vending machine.

In a most preferred embodiment of the present invention there is provided a method for automatic marketing of lollipops, comprising the steps:

step 1: providing a stick and container as claimed in claim 1;

step 2: attaching a candy to said candy retention end to form a lollipop;

step 3: optionally wrapping said candy;

step 4: inserting said lollipop into said compact container by pressing said stick against said separation device to separate and bend said elongated stick halves into said container sized and shaped for convenient handling in a vending machine;

step 5: loading a multitude of said filled containers into a vending machine; and step 6: instructing the consumer to pull said candy from said container, thereby reconstructing said stick as a rigid holder Yet further embodiments of the invention will be described hereinafter.

It will thus be realized that if a substantially spherical container were to be fitted around a prior-art lollipop, such container would be unreasonably large and expensive, and also too large for economic handling by a vending machine. In the novel marketing method of the present invention, the lollipop is held in a much smaller plastic container, which is suitable for a vending machine. Such container can be provided with a removable and replaceable cover and be retained by the consumer for hygienic storage, and possible storage and transport of a partially consumed lollipop. A known need for a bendable lollipop stick is thus served, and the packaging container thus obviates the need for the type of container disclosed by Jones in U.S. Pat. No. 5,702,742.

It will further realize that the bending and reunification arrangement could be utilized with other packing rather than the described container, i.e. differed configurations of the packing.

As is known, the fiber stress on a beam, which is subjected to a bending load, is a partial function of I, the rectangular moment of inertia. Stress rises in direct proportion to I, all other factors remaining unchanged. For a round section, I is approximately 0.05 $d^4$, where d is the rod diameter, while for a semi-circular section of the same radius I is approximately 0.0069 $d^4$. In other words, the bending stress on a semi-circular section is lower by a factor of more than 7 in comparison with the bending stress on a circular section beam of the same diameter. Consequently, if a circular beam were split into two separate beams, a much greater degree of bending would be allowed and such bending will not cause permanent material deformation. When the two semi-circular halves are rejoined the mechanical properties of the resulting cylindrical-section beam are almost the same as that of a solid circular-section beam. These considerations form the basis for the present invention.

SHORT DESCRIPTION OF DRAWINGS

The invention will now be described further with reference to the accompanying drawings, which represent by example preferred embodiments of the invention. Structural details are shown only as far as necessary for a fundamental understanding thereof. The described examples, together with the drawings, will make apparent to those skilled in the art how further forms of the invention may be realized.

In the drawings:

FIG. 1 is a perspective enlarged view of a preferred embodiment of the stick according to the invention;

FIG. 2 is a perspective, cut-in-half view of a container;

FIG. 3 is a perspective view of a lollipop shown in its stored configuration;

FIG. 4 is an elevational view of perspective view of a further preferred embodiment of the stick;

FIG. 8 is an elevational view of a lollipop stored in a closed container; and FIG. 9 is an enlarged elevational view of a stick provided with means for the retention of the candy.

DETAILED DESCRIPTION OF THE INVENTION

Figure 5:
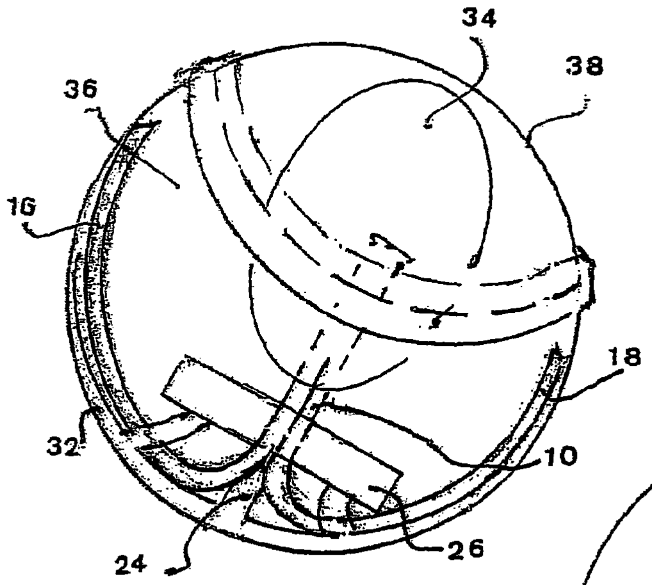
FIG. 5 is a perspective view of the lollipop inside a container.

There is seen in FIG. 1 an enlarged view of a lollipop stick 10. The stick shown is of round cross-sectional area form, and is suitably made of a flexible material, for example low-density polyethylene. The stick could also be of a different cross section.

The stick 10 is used in combination with a compact lollipop container 22 seen in FIG. 2.

The stick is provided with a dividable end 12, and a candy retention end 14. The major portion of the stick 10 is dividable into two flexible elongated halves 16, 18 along most of its length. The two halves 16, 18 can be rejoined to again form the solid substantially rigid stick 10 seen in the figure.

In the present embodiment the elongated halves 16, 18 are interconnected by a dovetail joint 20. The joint 20 is designed for low-pressure engagement.

Referring now to FIG. 2, there is seen half of a compact lollipop container 22, preferably provided with an internal separation device and an internal reunification device for the stick 10. Advantageously the container 22 is transparent.

The separation device comprises an outward-facing wedge-shaped blade 24, which contacts the dividable end 12 when a lollipop stick 10 is loaded or reloaded into the container 22. To ensure alignment the dividable end 12 of the stick 10 is advantageously provided with a lead-in chamber 28 as seen in FIG. 4. The container could however be produced without said separation device. The Separation could be done on assembly line during packing of the lollipop.

Axial pressure of the stick 10 against the blade 24 causes separation of the elongated halves 16, 18 seen in FIG. 3. Continued feeding-in of the stick 10 extends separation over an additional length, the final configuration being seen in FIG. 8.

Blade 24 could be part of an automatic packing line namely not an integral part of the container but external thereto.

During feeding in, there also occurs bending of the elongated halves 16, 18 of at least 180 degrees, as seen in FIG. 3. The bending results from contact between the newly separated elongated halves 16, 18 with inner walls 30 of the compact container 22. Guide rails 32 project from the inner walls 30 are provided to ensure that the elongated halves 16, 18 extend in an orderly manner.

As seen in FIG. 3 the lollipop is completed by a candy 34, which is firmly attached to the candy retention end 14 of the stick.

The stick 10 is retained in the divided and bent configuration during marketing. The stick 10 remains in the described split configuration until the lollipop is pulled out of its container 22 for consumption. As the stick 10 or candy 34 is pulled out, the reunification device, comprising a ring 26 acts to guide and align the two elongated halves 16, 18 and apply light pressure thereto. The two elongated stick halves pass through the reunification ring 26 and are firmly rejoined thereby to form a substantially straight rigid stick 10 supporting the candy 34.

With reference to the rest of the figures, similar reference numerals have been used to identify similar parts.

FIG. 5 illustrates a compact lollipop container 36 completed by attachment thereto of a discrete closure 38 to form a housing shaped substantially as a sphere. The container 36 is of substantially semi-spherical form and of moderate size. Thus the container 36 and its contents 10, 34 can be readily bulk loaded into and dispensed from a low-cost vending machine (not shown) having a simple feed mechanism.

Figure 6:
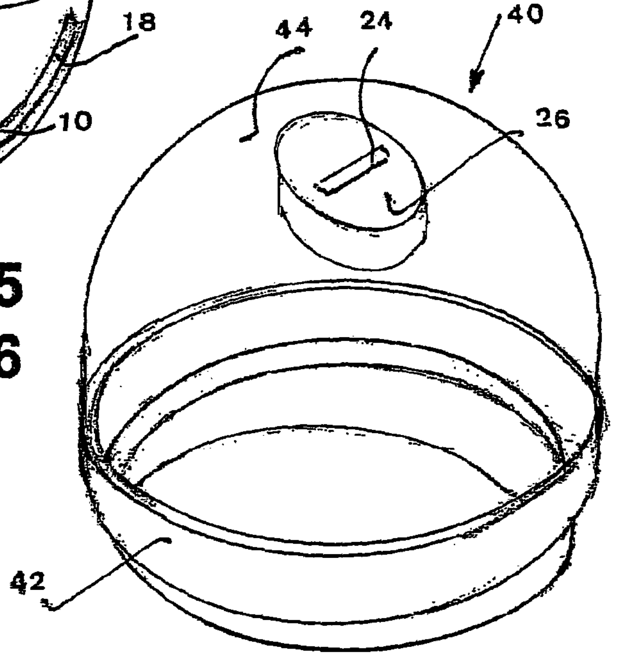
FIG. 6 is a lollipop container configured for easy opening and reuse by a child.

Seen in FIG. 6 is a further embodiment of the container assembly 40. The discrete closure 42 of the present embodiment is a light fit on the container body 44, and is molded using a bright color. The closure 42 is readily removable and replaceable by children, and allows storage in the container assembly 40 of a partially consumed lollipop.

Figure 7:
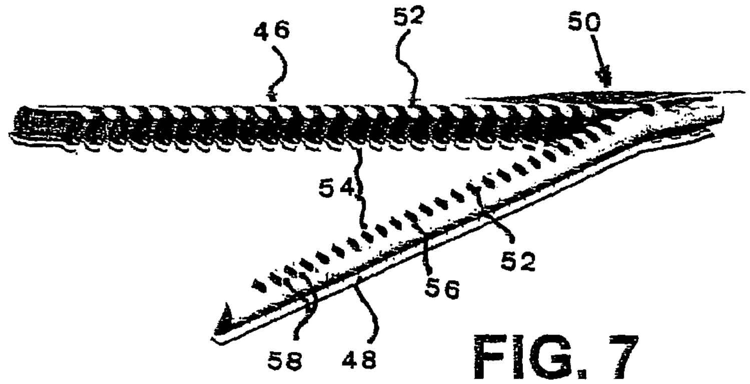
FIG. 7 is a photographic view of a preferred stick embodiment provided with inter-engaging teeth.

FIG. 7. In the present embodiment the two elongated halves 46, 48 of the lollipop stick 50 are provided with multiple interlockable teeth 52 along their length. A bulge 54 at each tooth extremity is accommodated by a recess 56 between the roots 58 of a pair of similar opposing teeth projecting from the opposite elongated half of the stick.

The stick 50 is reconstructed by the interlocking of the two elongated halves 46, 48 during withdrawal from a container, for example 22 in FIG. 2.

The advantage of the present embodiment lies in that the reunification ring 26, seen in FIG. 2, need not apply pressure to the outer faces of the elongated halves 46, 48. While the elongated halves are still bent, the teeth 52 of one half readily inter-engage with the teeth of the second half, whereafter straightening of the two halves 46, 48 automatically causes the interlocking of previously inter-engaged teeth. Furthermore, the recesses 56 formed between adjacent teeth further contribute to flexibility of the elongated halves. Yet a further advantage of the present embodiment is that after the teeth 52 are interlocked there can be no axial movement of one elongated half 46 relative to the second elongated half 48, thus improving rigidity.

Referring now to FIG. 8, there is seen a packaged lollipop 60 comprising the lollipop candy 34 retained on a stick 10. The lollipop 60 is hermetically encapsulated in a plastic container 62 intended for single use only and shaped substantially spherically for convenient handling in a vending machine. The stick 10 is held in its bent form while inside the container 62. The container 62 is opened before consumption by cutting or breaking a peripheral break line 64. Thus there is eliminated any chance of contamination. Optionally shelf life can be increased by filling the container 62 with an inert gas other than air, for example nitrogen, or by sealing the container under vacuum.

Turning now to FIG. 9, there is seen a further embodiment of a lollipop stick 66. The lollipop stick is further provided with form irregularities 68 proximate to the candy retention end 70. As the user pulls the candy 72 out of the container 22 seen in FIG. 2, it is important to enhance resistance to unwanted withdrawal of the stick 66 from the candy 72.

Figure 10:
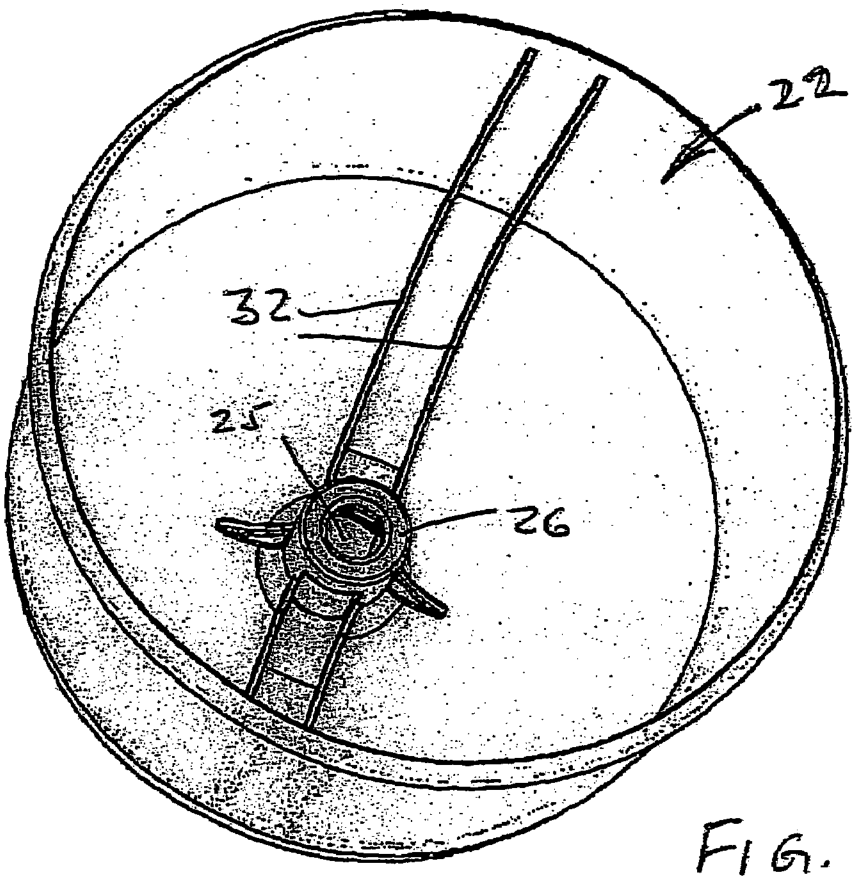
FIG. 10 is a container where the separation blade is removed

FIG. 10 illustrates container 22 reunification ring 26 guide 32 however without separation blade 24.

The separation is preformed by an automatic packing machine having a separation blade, which is inserted into container 22 via apparatus 25.

Figure 11:
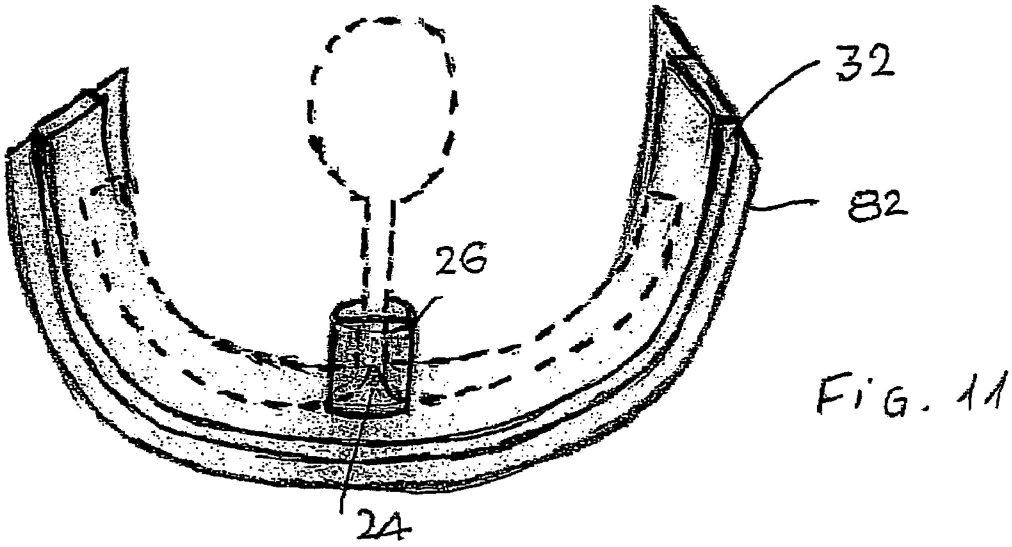
FIG. 11 is a stand-alone bending and reunification arrangement.

FIG. 11 illustrates a stand-alone unit which comprises a bent part 82 provided with guide rails 32, a reunification ring 26 and a separation bulge 24. Such stand above unit could be incorporation in many packings and configurations.

The present invention also provides a method for automatic marketing of lollipops, which comprises the following steps.

step 1: providing a divided stick and a compact container as described with reference to FIGS. 2 and 7;

step 2: attaching a candy to the candy retention end to form a lollipop;

step 3: optionally wrapping the candy;

step 4: inserting the lollipop into the container by pressing the divided end of the stick against the separation device to separate and bend the elongated stick halves inside the container sized and shaped for convenient handling in a vending machine;

step 5: bulk loading a multitude of the filled containers into a vending machine; and step 6: instructing the consumer to pull the candy from the container, thereby reconstructing the stick as a rigid holder The scope of the described invention is intended to include all embodiments coming within the meaning of the following claims. The foregoing examples illustrate useful forms of the invention, but are not to be considered as limiting its scope, as those skilled in the art will readily be aware that additional variants and modifications of the invention can be formulated without departing from the meaning of the following claims.

I claim:

1. A lollipop stick made of a flexible material in combination with a compact lollipop container, wherein said stick is provided with a dividable end and a candy retention end, the major portion of said stick being dividable into two elongated halves by insertion into a compact lollipop container provided with a separation device, causing separation of said elongated halves, and bending thereof of at least 180 degrees during said insertion resulting from contact with inner walls of said container, a candy being firmly attached to said candy retention end, said stick being retained in said divided and bent configuration, said compact lollipop container being further provided with a reunification device, whereby on opening of said container and withdrawal there from of said candy said two elongated stick halves pass through said reunification device and are firmly rejoined thereby to form a substantially straight rigid stick supporting said candy.

2. The lollipop stick as claimed in claim 1 wherein the container is provided with a separation device in a form of a blade.

3. The lollipop stick as claimed in claim 1 wherein the reunification device has a cross section as of the stick.

4. The lollipop stick in combination with a compact lollipop container as claimed in claim 1, said container being completed by attachment thereto of a discrete closure to form a housing shape readily dispensed by a simple vending machine.

5. The lollipop stick and container as claimed in claim 4, wherein said closure is readily removable and replaceable by children to allow storage of a partially consumed lollipop.

6. The lollipop stick and container as claimed in claim 1, wherein said container is transparent.

7. The lollipop stick as claimed in claim 1, wherein said two elongated stick halves are provided with multiple interlockable teeth along their length, a bulge at each tooth extremity being accommodated by a recess between the roots of a pair of similar opposing teeth projecting from the opposite elongated half of said stick, as said stick is reconstructed by the interlocking of said two elongated halves during withdrawal from said container.

8. The lollipop stick as claimed in claim 1, being made of low-density polyethylene.

9. A packaged lollipop comprising the lollipop candy, retained on a stick as claimed in claim 1, and being encapsulated in a disposable plastic container shaped for convenient handling in a vending machine, said stick being held in its bent form while inside said container.

10. The lollipop stick as claimed in claim 1, being further provided with form irregularities at said candy retention end to enhance resistance to unwanted withdrawal of said stick from said candy.

11. A method for the automatic marketing of lollipops, comprising the steps:

step 1: providing a stick and container as claimed in claim 1;

step 2: attaching a candy to said candy retention end to form a lollipop;

step 3: optionally wrapping said candy;

step 4: inserting said lollipop into said compact container by pressing said stick against said separation device to separate and bend said elongated stick halves into said container sized and shaped for convenient handling in a vending machine;

step 5: loading a multitude of said filled containers into a vending machine; and step 6: instructing the consumer to pull said candy from said container, thereby reconstructing said stick as a rigid holder.

* * * * *